United States Patent
Sanneck et al.

(10) Patent No.: US 12,137,033 B2
(45) Date of Patent: Nov. 5, 2024

(54) CONTEXT-AWARE TRAINING COORDINATION IN COMMUNICATION NETWORK SYSTEMS

(71) Applicant: Nokia Technologies Oy, Espoo (FI)

(72) Inventors: Henning Sanneck, Munich (DE); Janne Tapio Ali-Tolppa, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/259,539

(22) PCT Filed: Dec. 28, 2020

(86) PCT No.: PCT/EP2020/087929
§ 371 (c)(1),
(2) Date: Jun. 27, 2023

(87) PCT Pub. No.: WO2022/144069
PCT Pub. Date: Jul. 7, 2022

(65) Prior Publication Data
US 2023/0412458 A1 Dec. 21, 2023

(51) Int. Cl.
 H04L 41/0895 (2022.01)
 H04L 41/0873 (2022.01)
 H04L 41/16 (2022.01)
(52) U.S. Cl.
 CPC ...... *H04L 41/0895* (2022.05); *H04L 41/0873* (2013.01); *H04L 41/16* (2013.01)
(58) Field of Classification Search
 CPC .. H04L 41/0895; H04L 41/0873; H04L 41/16
 See application file for complete search history.

(56) References Cited

U.S. PATENT DOCUMENTS 10,827,335 B1 * 11/2020 Trim ............... H04W 4/90
2016/0183102 A1    6/2016 Sanneck et al.
(Continued)

FOREIGN PATENT DOCUMENTS

| WO | 2014/198321 A1 | 12/2014 |
| WO | 2018/042232 A1 | 3/2018 |
| WO | 2021/224705 A1 | 11/2021 |

OTHER PUBLICATIONS

Mwanje et al., "Towards Cognitive Autonomous Networks: Network Management Automation for 5G and Beyond", Wiley Publication, Oct. 2020, 685 pages.
(Continued)

*Primary Examiner* — John A Follansbee
*Assistant Examiner* — Zonghua Du
(74) *Attorney, Agent, or Firm* — Robert P. Michal, Esq.; Carter, DeLuca & Farrell LLP (57) ABSTRACT

According to a method for implementing a training coordination function, at least one training request with which training of a network function instance of an autonomous network of a communication network system is requested is processed. Based on a result of the processing, it is decided whether to approve the at least one training request, or not. If the at least one training request is approved, the training is planned based on the at least one training request, an identification of the at least one training request is returned, and in accordance with the planning, an existing training state associated with the network function instance is stored or updated in a database which is configured to store existing training states associated with network function instances of the autonomous network.

1 Claim, 7 Drawing Sheets

(56) References Cited

U.S. PATENT DOCUMENTS

2017/0339023 A1* 11/2017 Aström .................. H04L 41/14
2019/0273662 A1* 9/2019 Mwanje ................ H04W 24/02

OTHER PUBLICATIONS

Romeikat et al., "Efficient, Dynamic Coordination of Request Batches in C-SON Systems", IEEE 77th Vehicular Technology Conference (VTC Spring), Jun. 2-5, 2013, 6 pages.

"Architectural framework for machine learning in future networks including IMT-2020", Series Y: Global Information Infrastructure, Internet Protocol Aspects, Next-Generation Networks, Internet of Things and Smart Cities, Future networks, Recommendation ITU-T Y.3172, Jun. 2019, 34 pages.

"FG ML5G Technical Specification Requirements, architecture, and design for machine learning function orchestrator", ITU-T FG ML5G, SG13-TD578/WP1, Jul. 20-31, 2020, 121 pages.

"Zero-touch network and Service Management (ZSM); Closed-Loop Automation; Part 1: Enablers", ETSI GS ZSM 009-1 V1.1.1, Jun. 2021, pp. 1-40.

"Zero-touch network and Service Management (ZSM); Closed-Loop Automation; Part 2: Solutions for automation of E2E service and network management use cases", ETSI GS ZSM 009-2 V1.1.1, Jun. 2022, pp. 1-30.

"3rd Generation Partnership Project; Technical Specification Group Services and System Aspects; Management and orchestration; Study on enhancement of Management Data Analytics (MDA) (Release 17)", 3GPP TR 28.809, V0.4.0, Jun. 2020, pp. 1-49.

International Search Report and Written Opinion received for corresponding Patent Cooperation Treaty Application No. PCT/EP2020/087929, dated Oct. 8, 2021, 13 pages.

\* cited by examiner

CONTEXT-AWARE TRAINING COORDINATION IN COMMUNICATION NETWORK SYSTEMS

RELATED APPLICATION

This application claims the benefit of and priority to PCT Patent Application No. PCT/EP2020/087929 filed on Dec. 28, 2020, which is incorporated by reference herein in its entirety.

TECHNICAL FIELD

At least some example embodiments relate to context-aware training coordination in communication network systems. For example, at least some example embodiments relate to Cognitive Autonomous Networks (CANs) in 5G networks and other (future) generations of wireless/mobile networks.

BACKGROUND

With the success of Self Organizing Networks (SONs), but also its shortcomings in terms of flexibility and adaptability to changing and complex environments, there is a strong demand for more intelligence and autonomy in network Operations, Administration and Management (OAM). The objective of CAN is that Cognitive Network Functions (CNFs) should be able to: 1) take higher level goals and derive the appropriate performance targets, 2) learn from their environment and their individual or shared experiences therein, 3) learn to contextualize their operating conditions and, 4) learn their optimal behavior fitting to the specific environment and contexts.

Context refers to all information external to the CNF itself, e.g., where in the network, when, under which load condition, the CNF operates. Furthermore, context includes information external to the network, which however may influence the operation of the network (e.g., weather conditions, event schedules, public transport and event schedules). Obviously, context and its changes, as well as the operation of CNFs have some specific spatial and temporal characteristics. Those characteristics can be described by known concepts like "impact area/time" or more generically "scope".

To realize the described "learning" in network operations, Artificial Intelligence and more specifically Machine Learning (ML) is employed. This is realized by embedding Machine Learning Algorithms (MLAs) inside the CNFs introduced above, which during training create an ML model, later used in the CNF's decision-making process. Note that the training process differs across ML categories (unsupervised, supervised, reinforcement) with the major characteristics that for supervised learning (human-created) labels are required in the training process, and for reinforcement learning not only observations (data collected in the respective operation environment), but also actions into that respective operation environment are required.

MLAs (and thus MLA-enabled CNFs) can deal with "concept drift", i.e., changes in operating point, e.g., a continuously increasing average load in a network over long time intervals like weeks. However, a change of "context", i.e., a change in a network-internal configuration or a change in a network-external characteristic may invalidate an ML model (or make it less accurate) inside a CNF, since it was trained in a different context setting.

Therefore, MLAs need to be re-trained when context, to which the MLAs have an explicit or implicit dependency, has been changed.

LIST OF CITATIONS

[MCN] H. Sanneck et al. "Management of Cognitive Networks", Intro presentation to the IPR Ideation workshop, May 2020.
[Y.3172] Architectural framework for machine learning in future networks including IMT-2020, June 2019.
[MLFO] Requirements, architecture, and design for machine learning function orchestrator, ITU-T FG ML5G, ML5G-I-248, June 2020.
[MDAS] Management Data Analytics Service (3GPP SA5 study), TR28.809.
Patent application WO 2018042232 A1.

LIST OF ABBREVIATIONS

5G Fifth Generation
CAN Cognitive Autonomous Network
CLA Closed Loop Automation
CM Configuration Management
CNF Cognitive Network Function
CNF-ITR Cognitive Network Function Instance Training Request
CNF-MD Cognitive Network Function Metadata
CNF-IMD Cognitive Network Function Instance Metadata
KPI Key Performance Indicator
ML, MLA Machine Learning, Machine Learning Algorithm
MO Managed Object
MOI MO Instance
NM Network Management
OAM Operations, Administration and Management
SON Self-Organizing Network
TCF Training Coordination Function
TM Training Management

SUMMARY

At least some example embodiments aim at providing training coordination for a CAN comprising a plurality of CNFs.

According to at least some example embodiments, a method, an apparatus and a non-transitory computer-readable storage medium are provided as specified by the appended claims.

In the following example embodiments will be described with reference to the accompanying drawings.

DESCRIPTION OF THE EMBODIMENTS

As mentioned above, MLAs, and thus MLA-enabled CNFs of a CAN of a communication network system (e.g. a 5G network system or other (future) generation of wireless/mobile network system) need to be re-trained when context, to which the MLAs have an explicit or implicit dependency, has been changed. For example, a change of context comprises a change in an internal configuration of the communication network system or a change in a characteristic external to the communication network system.

Note that CNFs can be also referred to as "Cognitive Functions" (CFs, having a wider applicability of "learning" beyond network resources) or "Network Automation Functions" (NAFs, being functions with networking scope comprising in a wider sense both non-learning (rule-based) and CNFs).

Dependencies between context and MLAs, triggering re-training, are e.g.

A known incidental change in the network configuration (e.g., the rollout of new SW load, deployment of a new neighbor cell, a new data source becoming available, an existing data source missing, a new network slice subnet being configured)

A known incidental change in the network-external context (e.g., a crowd getting together at a specific venue; a forecast or detection of a changed weather condition)

Intrinsic validation: i.e., the MLA/CNF itself or the management function of the MLA/CNF or any other entity detects that the trained model is not adequate anymore (detection of a previously unknown incidental context change)

An operator-configured periodicity (i.e., a pro-active measure to adapt to unknown, potentially undetected, context changes)

While the described problem is already valid for an individual MLA/CNF, in a realistic system setting, there are a range of different types of CNFs and many different instances of these types present, operating simultaneously, making the problem much more complex. Each of these instances has their own scope, i.e. validity area that they are optimizing, and measurement area where the required input data is collected. Collecting the necessary training data can require significant network resources and the training itself requires also computational resources. Therefore, the network communication system can significantly benefit from coordination of the training.

In a cognitive system, the responsible functional unit, which may simply be called a controller, ensures that the individual functions do not cause adverse effects to one another and that they do not conflict with respect to the network resources. For example, patent application WO 2018042232 A1 proposes two functions, a coordination engine and a configuration management engine which are respectively responsible for learning coordination effects among the functions and reconfiguring the functions as may be necessary. The functions of the coordination engine and configuration management engine may be integrated into a single Control, Coordination and Configuration function (C3F) within a Cognitive Network Management system, illustrated by FIG. 1. The Cognitive Network Management system comprises, besides the C3F (Configuration, Control and Coordination Function) Decision Applications (DApps) and a Network Objectives Manager managing the DApps and the C3F.

The C3F is responsible for the end-to-end performance of the Cognitive Autonomous Network (CAN), with functionality to:

Ensure proper concurrency control among CNFs

Learn and implement coordination decisions among multiple CNFs, and (Re)configure the CNF in line with the desired end to end goals.

Figure 1:
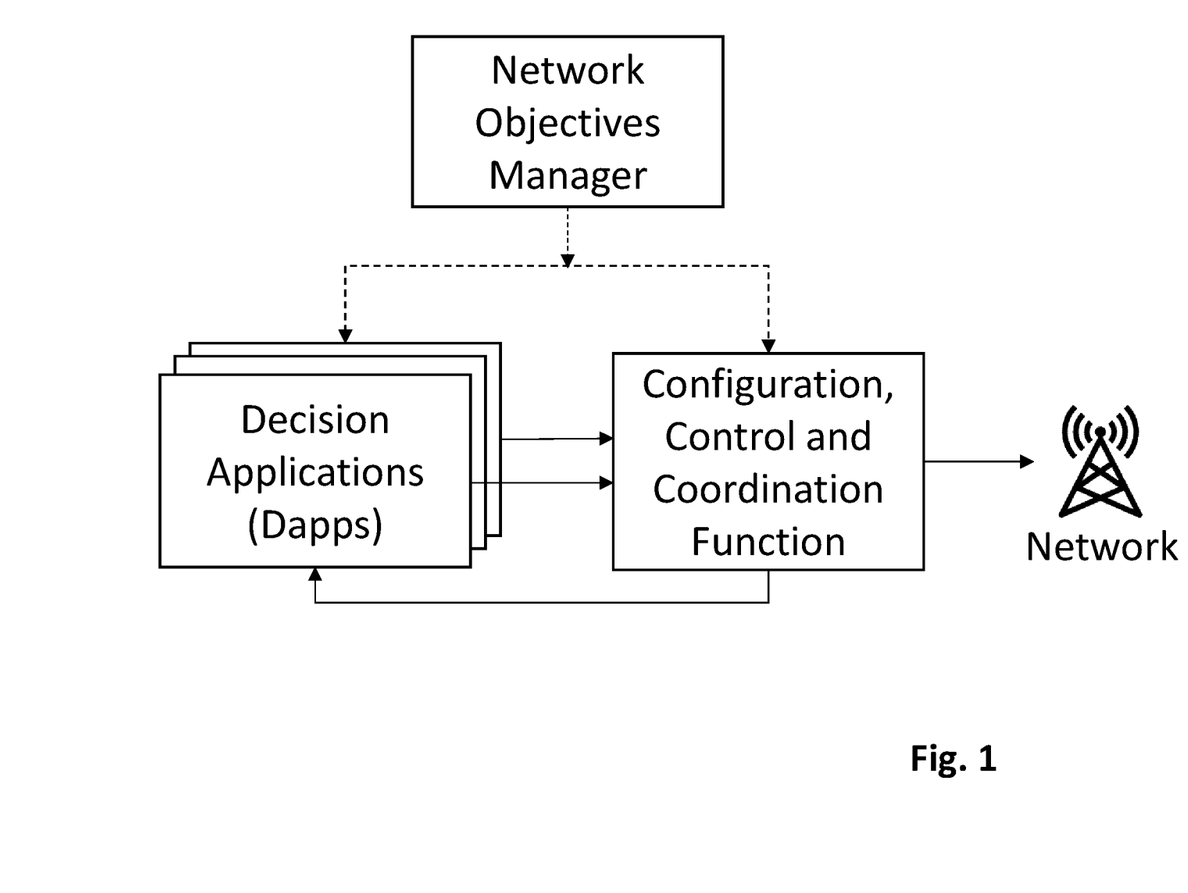
FIG. 1 shows a schematic diagram illustrating a C3F within a cognitive network management system with which at least some example embodiments can cooperate.

In general, the C3F (also referred to as controller) shown in FIG. 1 learns to coordinate the behavior of the individual network automation function via a closed loop (shown between the C3F and Decision Applications (DApps)) in which a given CNF 1 proposes a change on the network, which is then evaluated by the controller together with the other CNFs and based on which evaluation the controller advises the actor CNF 1 on if/how to improve its recommendations.

However, the C3F can only coordinate the actions of CNFs, but has no knowledge of the ML training requirements of CNFs and the provided method is unable to coordinate them.

In the following example embodiments will be described with reference to FIGS. 2 to 7.

According to at least some example embodiments, a Training Coordination Function (TCF) is proposed that plans, executes, coordinates and optimizes CNF training requests. It is noted that there is no specific limitation to CNF training requests. At least some example embodiments are applied to network functions which happen to have a training (coordination) need.

Figure 2:
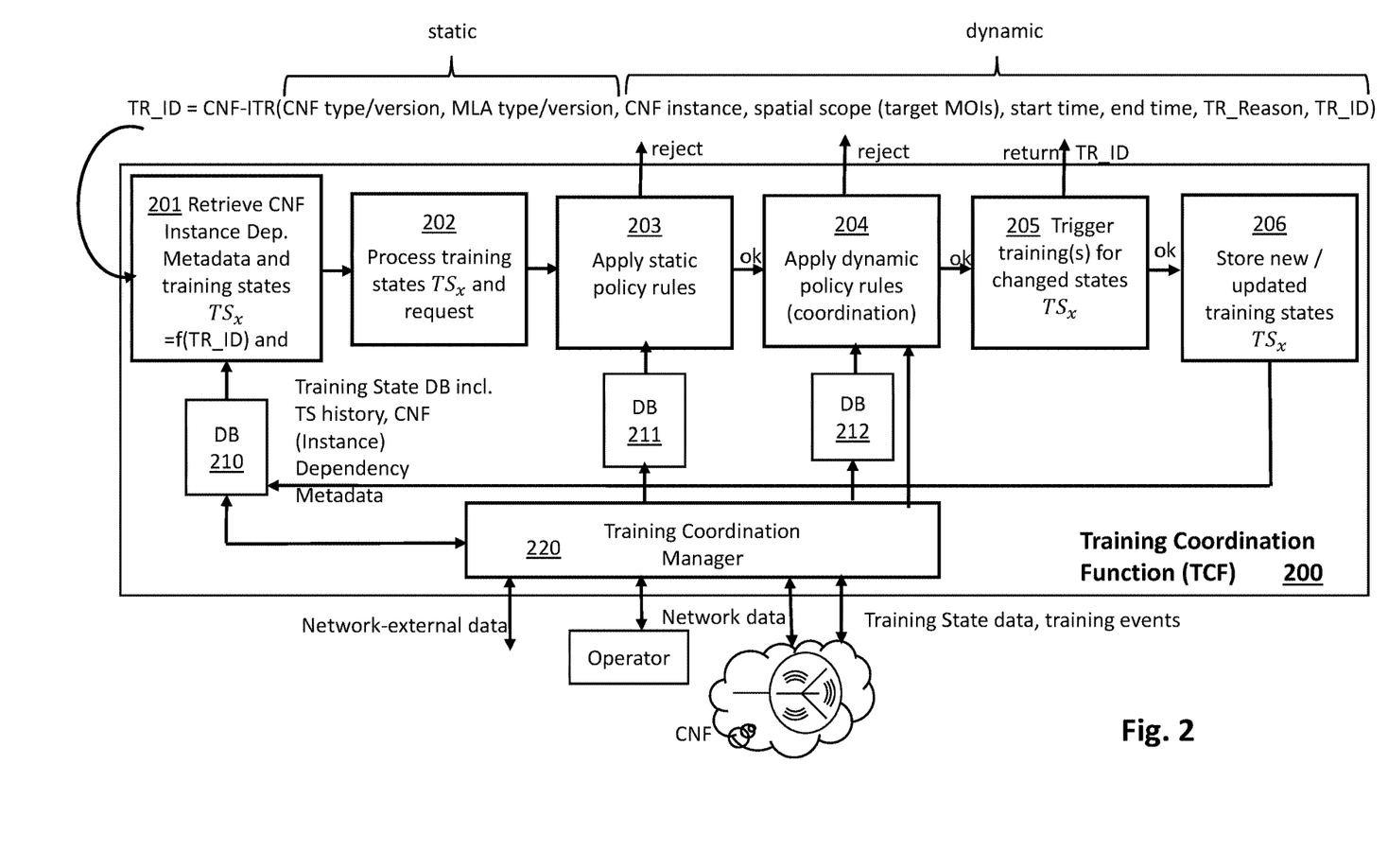
FIG. 2 shows a schematic diagram illustrating a training coordination method as part of a Training Coordination Function (TCF) according to at least some example embodiments.

FIG. 2 shows functional blocks and flow of run-time training coordination according to at least some example embodiments, which is driven by MLA requirements, context change and current training state. It is noted that there is no specific limitation to MLA. According to at least some example embodiments, any algorithms suitable for training network functions are usable.

When a potential retraining need is detected a message (CNF Instance Training Request: CNF-ITR, also referred to as training request) is conveyed to the Training Coordination Function (TCF) 200. With the training request, training of a cognitive network function instance (CNF instance) of the cognitive autonomous network (CAN) is requested.

The training request contains a training descriptor. According to at least some example embodiments, the training descriptor comprises at least one of the following information about:

a network function type, e.g. cognitive network function type, a network function version, e.g. cognitive network function version, an algorithm type, e.g. a machine learning algorithm type, and an algorithm version, e.g. a machine learning algorithm version, as static information, and the network function instance, e.g. the cognitive network function instance, a spatial scope (e.g. spatial scope associated with the (C)NF instance, e.g. target Managed Object Instances (MOIs)), a temporal scope (e.g. temporal scope associated with training the (C)NF instance, e.g. start time and end time of training), constraints (e.g. constraints associated with data used in training), a type of trigger (e.g. type of trigger that has triggered the at least one training request), type of reason (e.g. type of reason that has triggered the at least one training request), and reference to earlier training state via a Training Request ID (TR_ID), as dynamic information.

For example, a potential retraining need is detected by a CNF coordinator/orchestrator, by a CNF instance, by another CNF instance, by the management of the CNF/by an admin, by an entity detecting a network-external context change, etc.

The training coordination is based on the training descriptor together with considering own internal state of the TCF 200, e.g., an earlier training state of the same CNF instance, training state of other CNF instances.

As illustrated in function block 201 of FIG. 2, based on CNF Instance Metadata (CNF-IMD) to be described later on, the TCF 200 retrieves existing training states TSx which are relevant for the new training request CNF-ITR from a Training State DB 210 and, in function block 202, processes the retrieved training states TSx and the training request CNF-ITR.

According to at least some example embodiment, the retrieved training states TSx and the training request CNF-ITR are processed, in function block 202, by identifying differences between the training request and a current training state for the same CNF instance, checking impacts on "adjacent" trained CNF instances or CNF instances currently in training, or the like.

The TCF 200 decides if (re-)training(s) is/are required and if yes, what are the training descriptions. The training descriptions include e.g. spatial scope, temporal scope, complete or only partial retraining, requirement of new training data collection, etc.

According to at least some example embodiment, the above decision is done by applying, in function block 203, static policy rules to the static part (static information) of the training descriptor and the training states retrieved from the Training State DB 210, and by applying, in function block 204, dynamic policy rules to the dynamic part (dynamic information) of the training descriptor and the training states retrieved from the Training State DB 210.

If the training request is approved, in function block 205, the required (re-)training(s) are planned based on the training descriptions derived in the previous function blocks, and a Training Request ID (TR_ID) (also referred to as identification of the training request) is returned to the requesting entity. Otherwise, in case the training request is rejected in function block 203 or 204, the flow ends at this function block.

The Training Request ID is a reference to the internal "Training State" of the TCF 200, which, according to at least some example embodiments, includes references to already collected training data.

According to at least some example embodiments, the TCF 200 chooses to collect a batch of training requests to allow for a combined planning before executing the training requests.

Additionally, according to at least some example embodiments, the TCF 200 determines if a trained model or collected training data can be used for other CNF types/other CNF instances of the same type, and recommends reuse to those CNF instances, as will be described in more detail later on.

Finally, in function block 206, the training description(s) become training state(s) which is/are stored in the Training State DB 210.

Figure 3:
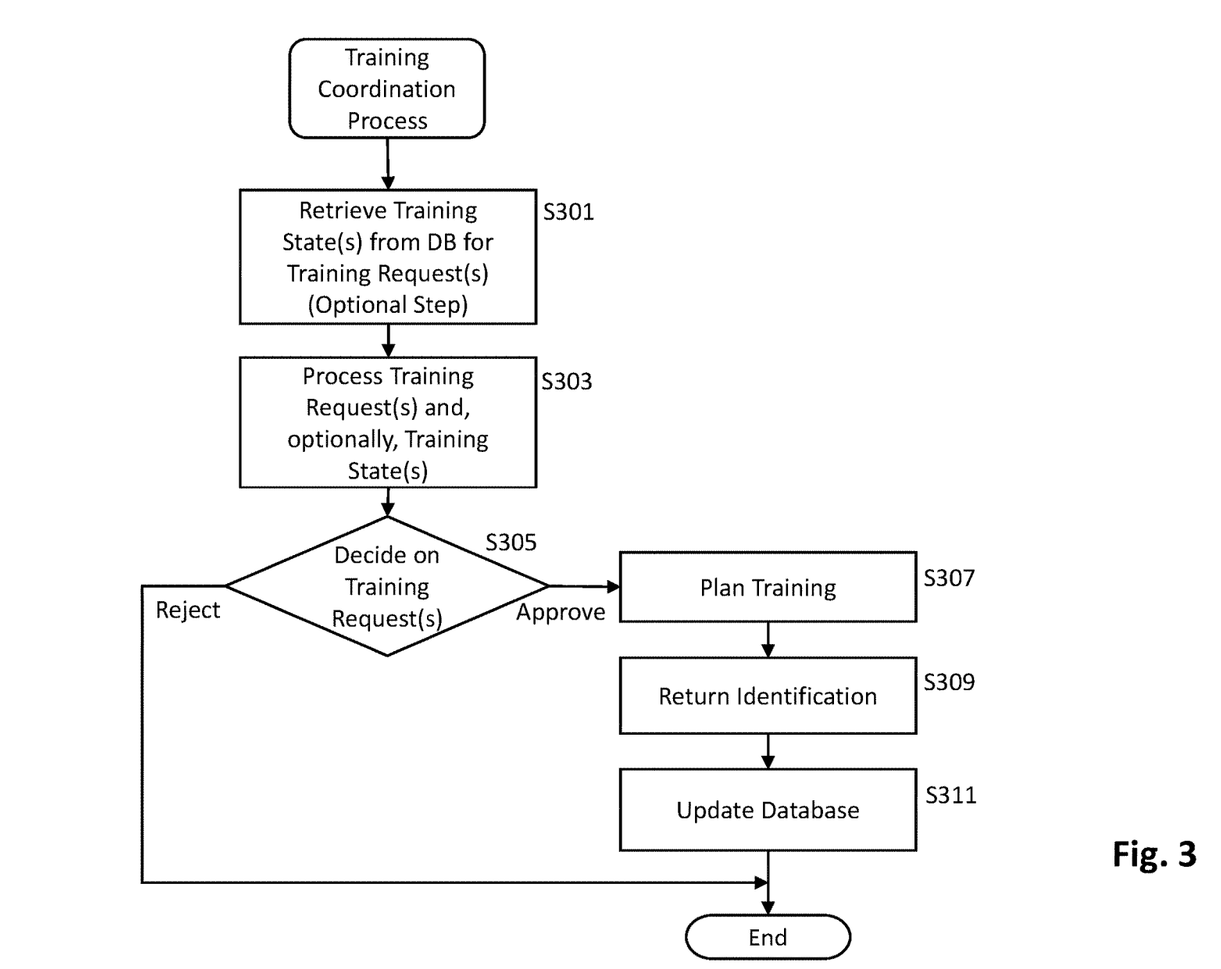
FIG. 3 shows a flowchart illustrating a training coordination process according to at least some example embodiments.

Now reference is made to FIG. 3 showing a flowchart illustrating a training coordination process according to at least some example embodiments.

In step S301, from a database (e.g. Training State DB 210) which stores existing training states associated with network function instances of an autonomous network of a communication network system, one or more existing training states are retrieved which are associated with at least one training request with which training of a network function instance of the autonomous network is requested. According to at least some example embodiments, processing of step S301 comprises the functionality of function block 201 as described above. Then, the process advances to step S303.

In step S303, the one or more existing training states and the at least one training request are processed. According to at least some example embodiments, processing of step S303 comprises the functionality of at least one of function blocks 202, 203 and 204. Then, the process advances to step S305.

According to at least some example embodiments, in case there is no existing training state associated with the at least one training request stored in the database, in step S301 no training states are retrieved and in step S303, the at least one training request is processed without considering training states.

In step S305, based on a result of the processing in step S303, it is decided whether to approve the at least one training request, or not. According to at least some example embodiments, processing of step S305 comprises the functionality of at least one of function blocks 203 and 204.

In case the at least one training request is approved in S305, the process advances to step S307. In step S307, the training is planned based on the at least one training request. According to at least some example embodiments, processing of step S307 comprises the functionality of function block 205. Then the process advances to step S309.

In step S309, an identification of the at least one training request is returned e.g. to an entity having issued the training request. According to at least some example embodiments, processing of step S309 comprises the functionality of function block 205. Then the process advances to step S311.

In step S311, in accordance with the planning in step S307, an existing training state associated with the network function instance is stored or updated in the database. According to at least some example embodiments, processing of step S311 comprises the functionality of function block 206. Then the process ends.

In case the at least one training request is rejected in S305, the process ends. Optionally, before terminating the process of FIG. 3, it is indicated towards the entity having issued the training request that the training request has been rejected.

Again referring to FIG. 2, the TCF 200 contains a Training Coordination Manager 220 which has an external interface to other entities incl. human operators and internal interfaces to the described functional blocks. External entities are in particular (→ and ← referring to inbound/outbound into/from the TCF 200):

→Human operators to configure policies which in turn are used in the static and dynamic training coordination in function blocks 203 and 204 (e.g. acquiring policies for use to decide training descriptions);

←Human operators getting notifications (e.g. providing notifications to users);

←Configuring context sources of external data and/or network data (e.g. providing, to context sources, at least one of external data which is data external to the communication network system and network data which is data inside the communication network system);

→Obtaining data from those context sources to drive the described dynamic part of the coordination (e.g. acquiring data from the context sources for use to decide training descriptions);

←TCF providing training state information to CNF instances, coordinators and other entities—including recommendations for retraining with new available training data or reuse of the trained model (e.g. providing training state information to at least one of cognitive network instances, coordinators and other entities, providing training state information including recommendations for retraining with new available training data or reuse of a trained model to at least one of cognitive network instances, coordinators and other entities);

→CNF instances/coordinators updating on events relevant to the training (e.g., training completed/training result, training aborted, etc.) (e.g. acquiring updates on events relevant to the training): these events lead to updates of the training states in the Training State DB 210 (e.g. updating the training states in the database based on these events).

According to at least some example embodiments, policies for use in the static and dynamic training coordination in function blocks 203 and 204 are stored in memories 211 and 212 of the TCF 200.

Figure 4:
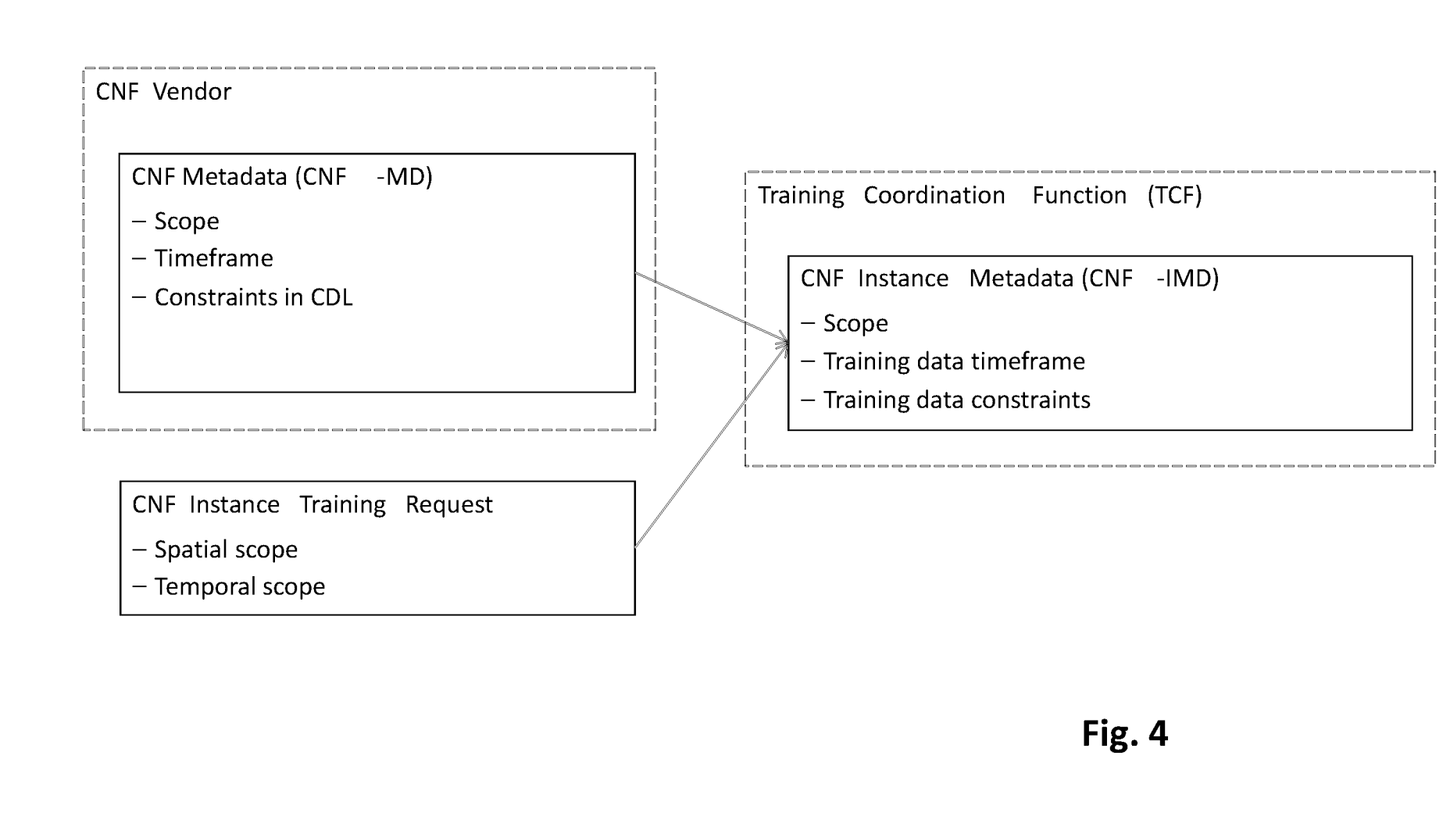
FIG. 4 shows a diagram useful for explaining creation of CNF instance metadata according to at least some example embodiments.

According to at least some example embodiments, at design-time, the TCF 200 is configured with CNF Metadata (CNF-MD) provided by a CNF vendor as illustrated in FIG. 4. At run-time, which will be described in more detail later on referring to FIG. 5, the TCF 200 combines the CNF-MD with the CNF Training Request to create CNF Instance Metadata (CNF-IMD).

The CNF-MD provides information on the training data requirements, for example:

The scope in terms of containment and relationships of the Managed Objects (MOs). For example, the scope of a CNF comprises a RAN cell and all its immediate neighboring cells.

The required time interval of data to train the CNF instance (timeframe), for example, information on the hours of day to be included and the required number of data points.

Constraints for the data used in training in Constraint Definition Language (CDL), e.g. constraints on the configuration parameters of the MOs and the KPIs they report during the training data collection. If the constraints are not satisfied, the data may not be suitable for training the CNF.

As described above, the CNF-ITR includes the spatial and temporal scope of the CNF instance training request. The TCF 200 integrates this with the CNF-MD of the CNF type to derive the concrete dependencies for the CNF instance in the training request.

FIG. 4 illustrates how the CNF-IMD is created. When the TCF 200 receives a CNF training request, it looks up and maps it with the CNF-MD for that CNF type to create the CNF-IMD indicating training data scope and constraints to filter the required training data. If an acceptable dataset for training is not already stored, additional data collection needs to be triggered according to the required constraints. According to at least some example embodiment, the CNF-MD and e.g. also the CNF-IMD is/are stored in the Training State database 210.

Figure 5:
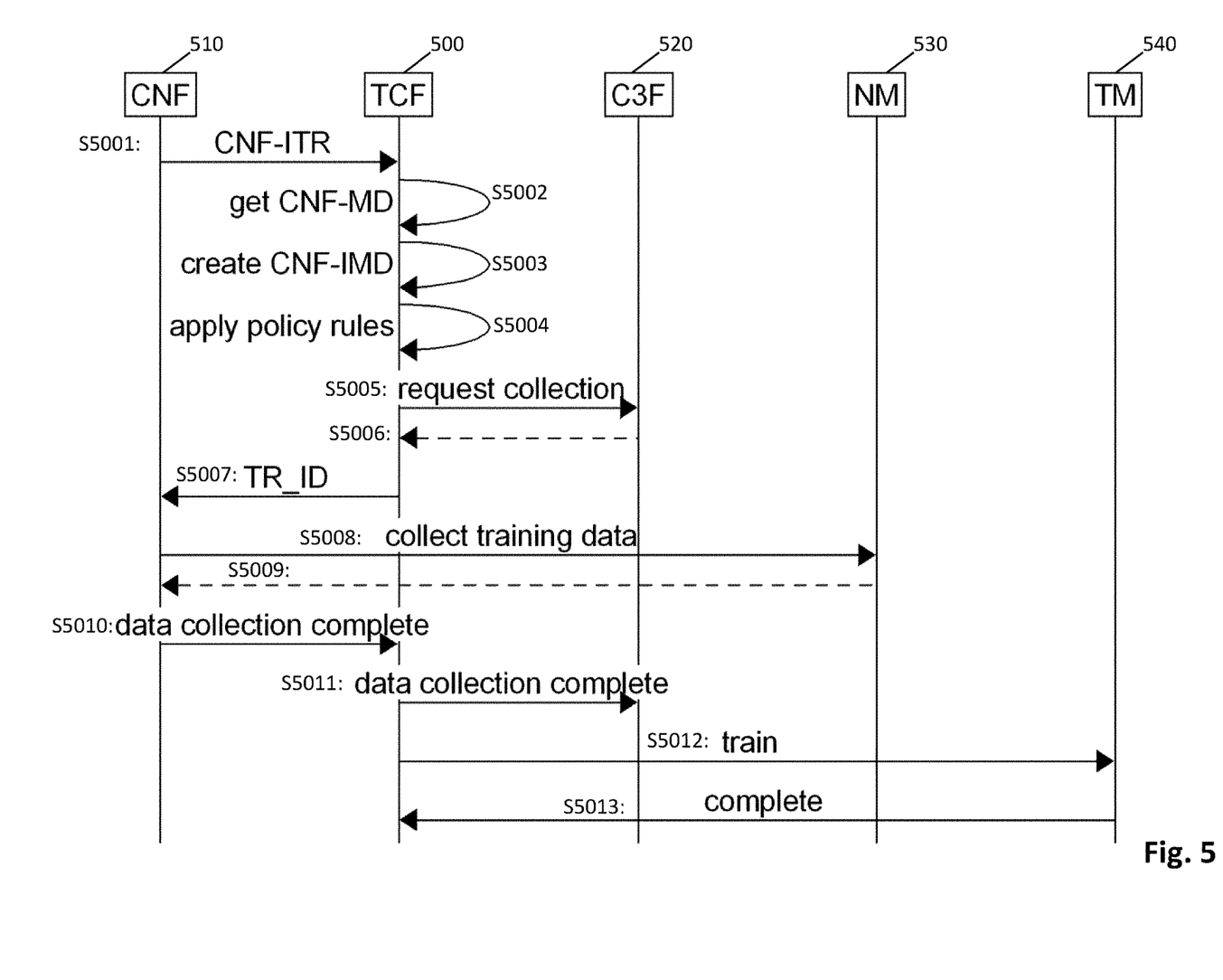
FIG. 5 shows a signaling diagram illustrating training coordination as part of a training process according to at least some example embodiments.

Now reference is made to FIG. 5 which shows a signaling diagram illustrating a training coordination process as part of an overall training process according to at least some example embodiments.

The training process, including coordination by a TCF 500 (e.g. corresponding to the TCF 200 of FIG. 2), is as follows:

In S5001, a CNF instance 510 of a cognitive autonomous network of a communication network system determines that (a re-)training is required and sends a CNF-ITR to the TCF 500.

In S5002, the TCF 500 gets the CNF-MD of the CNF instance 510 e.g. from the Training Request DB 210 and combines it with the CNF-ITR to create the CNF-IMD, which defines the training requirements for the CNF instance 510.

In S5003, the TCF 500 applies its own internal policy rules, both static and dynamic.

Optionally, as shown by S5005, S5006, the TCF 500 also requests permission for training/data collection from a coordinator like a C3F 520 corresponding to the C3F illustrated in FIG. 1. This enables for example blocking of other optimization functions that operate with the same scope as the measurement area of the CNF instance 510 to be trained, ensuring a consistent state in that scope during training data collection.

Based on S5003 and S5004, the TCF 500 determines if the CNF-ITR can be accepted and notifies the CNF instance 510 either of the rejection or of the TR_ID (S5007), if the training is accepted.

If accepted, the TCF 500 changes a training state label of the CNF instance 510 to "training data collection" e.g. in the Training State DB 210. If training data is already available, the sequence continues with S5012.

According to at least some example embodiments, the TCF 500 defers the start of the training to buffer several training requests into a batch.

In S5008 and S5009, the CNF instance 510 collects required training data from a Network Management (NM) 530, if it is not already available.

In S5010, the CNF instance 510 notifies the TCF 500 when the training data collection is completed, including a reference to the collected training data which is added to the training state.

Optionally, in S5011, the TCF 500 notifies the C3F 520 that the training data collection has been completed and that any related coordination restriction may be removed.

In S5012, the TCF 500 notifies a Training Manager (TM) function 540 that training of the CNF instance 510 can be started. The TCF 500 changes the training state label of the CNF instance 510 to "in training".

In S5013, the TM 540 notifies the TCF 500, when the training is completed and the TCF 500 updates the training state label of the CNF instance 510 to "inference".

For CNF instances using Reinforcement Learning (or other techniques which "learn from actions", i.e., require continuous data collection from the network and doing actions into the network), processes of S5008 and S5012, as well as S5009/S5010 and S5013 are executed concurrently.

Process S5010 then depends on if for such CNF instances there is a defined "end of the training period" which requires to notify the action coordinator (e.g., C3F) such that coordination policies related to the CNF instances in training and other related instances can be removed. In that case, the CNF instance has a combined training state label of "in training/ training data collection".

In case there is no defined end of the training period, the CNF instance has a combined training state label of "in training/training data collection/inference" and processes of S5009/S5010 and S5013 are only executed when the CNF instance terminates.

Figure 6:
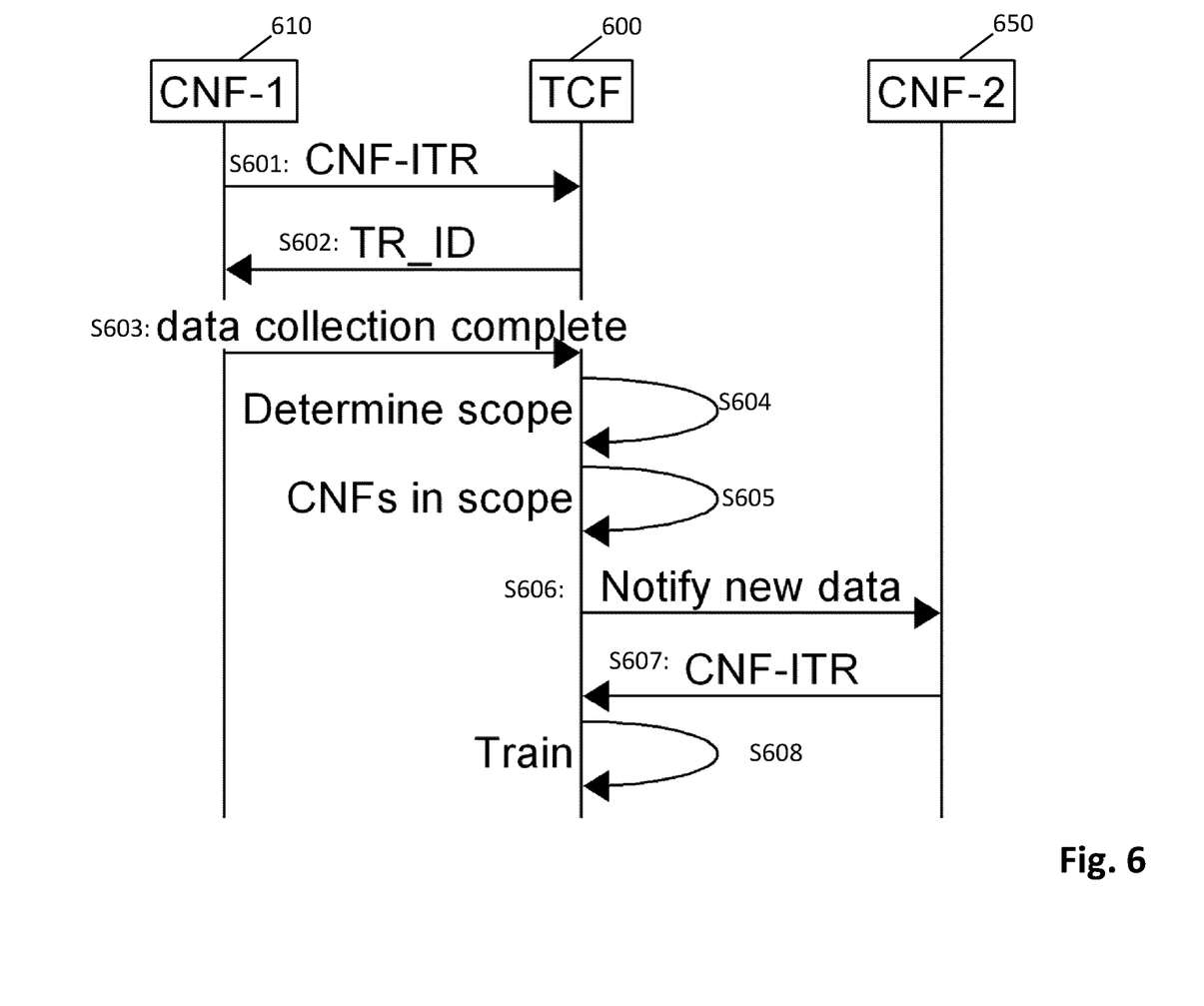
FIG. 6 shows a signaling diagram illustrating coordination and optimization of training data collection according to at least some example embodiments.

Now reference is made to FIG. 6 which shows how a TCF 600 (e.g. corresponding to TCF 500 of FIG. 5) can notify CNF instances pro-actively about new training data according to at least some example embodiments. Other steps of the training coordination process, shown in FIG. 5, are omitted for simplicity.

In S601, CNF-1 610 requests retraining by sending CNF-ITR to TCF 600.

As shown in FIG. 5, the TCF 600 processes the CNF-ITR (not shown in FIG. 6), and in S602 of FIG. 6 returns a TR_ID to signal that the request has been accepted.

In S603, CNF-1 610 performs the required training data collection and signals the TCF 600 of the completion.

In S604, TCF 600 determines the scope, where the training data has been collected.

In S605, TCF 600 searches a training state database (e.g. Training State DB 210) to find other CNF instances that are within the scope of the collected training data, e.g., which have enclosed monitoring areas.

In S606, TCF 600 determines that CNF-2 650 has an enclosed monitoring area and notifies it of the new available training data.

In S607, in case CNF-2 650 decides to use the new collected data for training, it sends a CNF-ITR to TCF 600.

In S608, TCF 600 start the training (coordination) process for CNF-2 650.

On a more general level, using the TR_ID, the TCF can push info about (new) training state to CNF instances. Also, with the TR_ID the CNF-I can poll the TCF about (new) training state, e.g. including reference to (new) training data.

According to at least some example embodiments, the TCF determines requirements of data collection for two or more training requests which overlap in scope, and combines the requirements of data collection into a task of training data collection, with a combined scope of the two or more training requests. For example, the TCF requests permission for training data collection based on the task of training data collection from the coordinator (e.g. C3F 520 of FIG. 5). In this case the training data collected for one training request may not be suitable for the other as such, but the scopes overlap at least partially, so that the TCF usefully creates a combined training data collection task that covers the scope and requirements of more than one training requests.

Advantages:

According to at least some example embodiments, training assurance, through coordination, is achieved in that no context change in the approved scope impairs the data collection/training, and reinforcement learning functions can take actions in the permitted scope (therefore TCF cooperating with a coordinator).

According to at least some example embodiments, a unified method is provided in that all network-internal and -external context changes affecting (re-) training are addressed. Network-internal context changes are applicable to both domain-internal and cross-domain (e2e) re-training triggers.

According to at least some example embodiments, automatic resolution of training dependencies is provided: one training request may have multiple dependencies and thus trigger different (re-)trainings and model re-uses.

The TCF can handle such cases without relying on external entities due to the training state DB.

At least some example embodiments are adapted to MLA-type: opposed to legacy coordination entities, the TCF is not only aware of the (ML- or not ML-based) decisions ("decision coordination"; based on the interaction with a CNF coordinator) or coarse training spatial and temporal characteristics, but knows about MLA-type-dependent training requirements.

According to at least some example embodiments, efficiency is improved by batch operation: the training requests are be buffered in meaningful time intervals such that the decision making is covering a set of related requests together rather than individually.

According to at least some example embodiments, efficiency is improved by re-use/fallback of training state: if the temporal scope is well defined and limited to a time period, the TCF can retrieve and store the current trained model in the training state, trigger re-training (or deploy a different pre-trained model). Once the defined time period is over the old, the stored model can replace the other model again.

According to at least some example embodiments, an intelligent solution is provided: the TCF itself can be implemented as a "learning" function, i.e., the policy rules used in the coordination can be (a combination) of preconfigured rules, probabilistic rules or rules derived from a ML model.

At least some example embodiments are independent of context detection, general coordination and training management: those related functions are supplied by the (potentially many different) external context detection entities, by external coordinators which have also non-training related functionality and separate training managers which control the longer term training process rather than the events at the start and at the end of the training. Still there is well defined interaction with training management (FIG. 5): the TCF can detect if a new data collection/training can be used for multiple training requests of different CNF instances and also that a trained model for another CNF instance may be re-used for a specific training request. Still, for efficiency, according to at least some example embodiments, the TCF is implemented in connection with context detection, coordination (the C3F, or in a multi-domain approach with C4F and DC3 coordinators) and training management.

Figure 7:
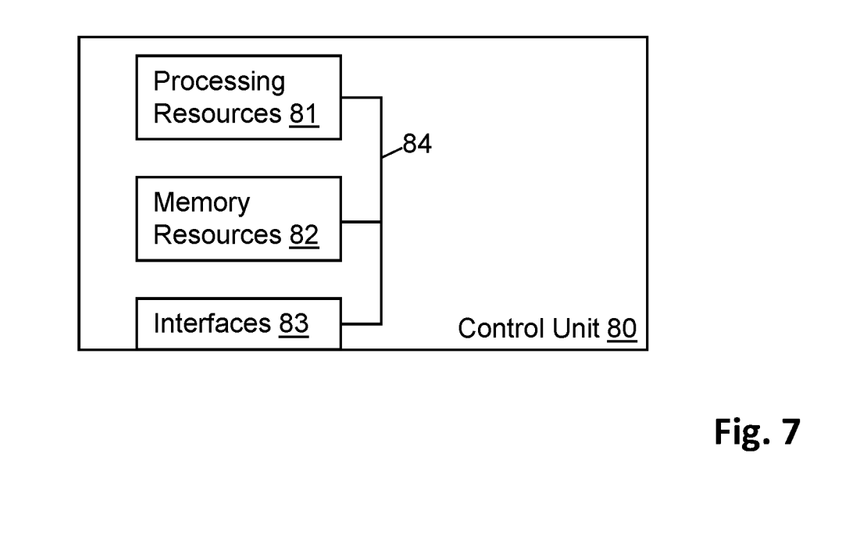
FIG. 7 shows a schematic block diagram illustrating a configuration of a control unit in which at least some example embodiments are implementable.

Now reference is made to FIG. 7 illustrating a simplified block diagram of a control unit 80 that is suitable for use in practicing at least some example embodiments. According to an implementation example, the method of FIG. 3 is implemented by the control unit 80.

The control unit 80 comprises processing resources (e.g. processing circuitry) 81, memory resources (e.g. memory circuitry) 82 and interfaces (e.g. interface circuitry) 83, which are coupled via a wired or wireless connection 84.

According to an example implementation, the memory resources 82 are of any type suitable to the local technical environment and are implemented using any suitable data storage technology, such as semiconductor based memory devices, magnetic memory devices and systems, optical memory devices and systems, fixed memory and removable memory. The processing resources 81 are of any type suitable to the local technical environment, and include one or more of general purpose computers, special purpose computers, microprocessors, digital signal processors (DSPs) and processors based on a multi core processor architecture, as non-limiting examples.

According to an implementation example, the memory resources 82 comprise one or more non-transitory computer-readable storage media which store one or more programs that when executed by the processing resources 81 cause the control unit 80 to function as a TCF (e.g. TCF 200, TCF 500, TCF 600) as described above.

Further, as used in this application, the term "circuitry" refers to one or more or all of the following:
  (a) hardware-only circuit implementations (such as implementations in only analog and/or digital circuitry) and
  (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
  (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to at least some example embodiments, an apparatus for implementing a training coordination function is provided. The apparatus comprises means for processing at least one training request with which training of a network function instance of an autonomous network of a communication network system is requested, means for, based on a result of the processing, deciding whether to approve the at least one training request, or not, and means for, if the at least one training request is approved, planning the training based on the at least one training request, means for returning an identification of the at least one training request, and means for, in accordance with the planning, storing or updating an existing training state associated with the network function instance in a database which is configured to store existing training states associated with network function instances of the autonomous network.

According to at least some example embodiments, the apparatus further comprises means for retrieving, from the database, one or more existing training states associated with the at least one training request, wherein the means for processing comprises means for processing the one or more existing training states and the at least one training request.

According to at least some example embodiments, the apparatus further comprises means for combining metadata of a network function type corresponding to the network function instance with data of a training descriptor included in the at least one training request, to thereby create metadata of the network function instance, wherein the metadata of the network function type has been provided at a design time of the training coordination function, and means for using the metadata of the network function instance to perform at least one of the following actions:
  retrieving the one or more existing training states from the database;
  processing the at least one training request;
  processing the one or more existing training states and the at least one training request.

According to at least some example embodiments, the training descriptor includes at least one of the following information about:
  a network function type,
  a network function version,
  an algorithm type,
  an algorithm version,
  the network function instance,
  a spatial scope associated with the network function instance,
  a temporal scope associated with training the network function instance,
  constraints associated with data used in training,
  a type of trigger that has triggered the at least one training request,
  a type of reason that has triggered the at least one training request, and
  a reference to an earlier training state via a training request identification.

According to at least some example embodiments, the metadata of the network function type comprises at least one out of the following:
  spatial scope associated with objects managed by the network function type,
  temporal scope associated with a time interval required to train a network function instance of the network function type,
  constraints associated with data used in training.

According to at least some example embodiments, the one or more existing training states comprise at least one of the existing training state of the network function instance and training states of other network function instances of the autonomous network.

According to at least some example embodiments, the means for processing comprises means for identifying differences between the at least one training request and the existing training state of the network function instance.

According to at least some example embodiments, the means for processing comprises means for checking impacts associated with the at least one training request on the other network function instances.

According to at least some example embodiments, the means for processing comprises means for deciding if training of the network function instance is required.

According to at least some example embodiments, the means for processing comprises means for, if it is decided that training is required, deciding training descriptions.

According to at least some example embodiments, the means for planning comprises means for planning the training based on the training descriptions.

According to at least some example embodiments, the means for deciding training descriptions comprises means for determining a spatial scope associated with the training.

According to at least some example embodiments, the means for deciding training descriptions comprises means for determining a temporal scope associated with the training.

According to at least some example embodiments, the means for deciding training descriptions comprises means for determining complete training.

According to at least some example embodiments, the means for deciding training descriptions comprises means for determining partial training.

According to at least some example embodiments, the means for deciding training descriptions comprises means for determining requirement of training data collection.

According to at least some example embodiments, the means for determining comprises means for applying static policy rules to a static part of the training descriptor.

According to at least some example embodiments, the means for determining comprises means for applying static policy rules to a static part of the one or more training states.

According to at least some example embodiments, the means for determining comprises means for applying dynamic policy rules to a dynamic part of the training descriptor.

According to at least some example embodiments, the means for determining comprises means for applying dynamic policy rules to a dynamic part of the one or more training states.

According to at least some example embodiments, the apparatus further comprises means for including, in the identification of the at least one training request, a reference to collected training data.

According to at least some example embodiments, the apparatus further comprises means for, before starting the processing, collecting two or more training requests requesting training of network function instances of the autonomous network.

According to at least some example embodiments, the apparatus further comprises means for determining usability of at least one of a trained model associated with the at least one training request and collected training data associated with the at least one training request for other network function types or other network function instances of same network function type, and means for notifying network function instances of the other network function types or the other network function instances of the same network function type about the usability.

According to at least some example embodiments, the apparatus further comprises means for acquiring the at least one training request from the network function instance, wherein the means for returning comprises means for returning the identification of the at least one training request to the network function instance.

According to at least some example embodiments, the apparatus further comprises means for acquiring policies for use to decide training descriptions.

According to at least some example embodiments, the apparatus further comprises means for providing notifications to users.

According to at least some example embodiments, the apparatus further comprises means for providing, to context sources, at least one of external data which is data external to the communication network system and network data which is data inside the communication network system.

According to at least some example embodiments, the apparatus further comprises means for acquiring data from the context sources for use to decide training descriptions.

According to at least some example embodiments, the apparatus further comprises means for providing training state information to at least one of network instances, coordinators and other entities.

According to at least some example embodiments, the apparatus further comprises means for providing training state information including recommendations for retraining with new available training data or reuse of a trained model to at least one of network instances, coordinators and other entities.

According to at least some example embodiments, the apparatus further comprises means for acquiring updates on events relevant to the training and updating the training states in the database based on these events.

According to at least some example embodiments, the means for processing further comprises means for requesting permission for at least one of training based on the training request and training data collection from a coordinator.

According to at least some example embodiments, the apparatus further comprises means for determining requirements of data collection for two or more training requests which overlap in scope, means for combining the requirements of data collection into a task of training data collection, with a combined scope of the two or more training requests, and means for requesting permission for the training data collection based on the task of training data collection from the coordinator.

According to at least some example embodiments, the apparatus further comprises means for notifying the coordinator about completion of the training data collection.

According to at least some example embodiments, the apparatus further comprises means for notifying a training manager function to start the training and updating the training state of the network function instance in the database, and means for acquiring information that the training is completed and updating the training state of the network function instance in the database.

According to at least some example embodiments, the apparatus further comprises means for determining a scope where training data for the training has been collected, means for searching the database for network function instances within this scope, and means for notifying the network function instances found in the database about the training data.

It is to be understood that the above description is illustrative and is not to be construed as limiting the disclosure. Various modifications and applications may occur to those skilled in the art without departing from the true spirit and scope as defined by the appended claims.

The invention claimed is:

1. An apparatus for implementing a training coordination function, the apparatus comprising at least one processor and at least one memory including computer program code, the at least one memory and the computer program code configured to, with the at least one processor, cause the apparatus at least to perform:
   processing at least one training request with which training of a network function instance of an autonomous network of a communication network system is requested;
   based on a result of the processing, deciding to approve the at least one training request; and
   based on the deciding to approve the at least one training request,
      planning the training based on the at least one training request;

returning an identification of the at least one training request to the network function instance; and in accordance with the planning, storing or updating an existing training state associated with the network function instance in a database which is configured to store existing training states associated with network function instances of the autonomous network;

retrieving, from the database, one or more existing training states associated with the at least one training request, wherein the processing comprises: processing the one or more existing training states and the at least one training request;

combining metadata of a network function type corresponding to the network function instance with data of a training descriptor included in the at least one training request, to thereby create metadata of the network function instance, wherein the metadata of the network function type has been provided at a design time of the training coordination function;

using the metadata of the network function instance to perform the following:

retrieving the one or more existing training states from the database;

the processing the at least one training request; and processing the one or more existing training states and the processing the at least one training request;

providing training state information including recommendations for retraining with new available training data or reuse of a trained model to the network function instance; and acquiring updates on events relevant to the training and updating the one or more existing training states in the database based on these events;

the training descriptor includes:
    information about the network function type,
    information about a network function version,
    information about an algorithm type,
    information about an algorithm version,
    information about the network function instance,
    information about a spatial scope associated with the network function instance,
    information about a temporal scope associated with the training the network function instance,
    information about constraints associated with data used in the training,
    information about a type of trigger that has triggered the at least one training request,
    information about a type of reason that has triggered the at least one training request, and
    information about a reference to an earlier training state via a training request identification.

\* \* \* \* \*